(12) United States Patent
Herrmann et al.

(10) Patent No.: US 9,403,493 B2
(45) Date of Patent: Aug. 2, 2016

(54) MOTOR VEHICLE DOOR LATCH MECHANISM

(75) Inventors: Michael Herrmann, Neukirchen-Vluyn (DE); Armin Handke, Duisburg (DE); Thorsten Bendel, Oberhausen (DE); Matthias Ochtrop, Dorsten (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 871 days.

(21) Appl. No.: 13/638,899

(22) PCT Filed: Feb. 5, 2011

(86) PCT No.: PCT/DE2011/000108
§ 371 (c)(1),
(2), (4) Date: Dec. 14, 2012

(87) PCT Pub. No.: WO2011/120484
PCT Pub. Date: Oct. 6, 2011

(65) Prior Publication Data
US 2013/0127246 A1 May 23, 2013

(30) Foreign Application Priority Data
Mar. 31, 2010 (DE) .................. 20 2010 004 424 U

(51) Int. Cl.
| | |
|---|---|
| *B60L 1/00* | (2006.01) |
| *B60L 3/00* | (2006.01) |
| *H02G 3/00* | (2006.01) |
| *B60R 16/00* | (2006.01) |
| *E05B 85/26* | (2014.01) |

(Continued)

(52) U.S. Cl.
CPC .............. *B60R 16/005* (2013.01); *E05B 81/66* (2013.01); *E05B 85/26* (2013.01); *E05B 2047/0071* (2013.01)

(58) Field of Classification Search
CPC .............................. B60R 16/005; E05B 17/22
USPC ............. 307/10.1, 9.1; 340/438, 426.28, 428; 292/201, 216
See application file for complete search history.

(56) References Cited

U.S. PATENT DOCUMENTS

| | | | | |
|---|---|---|---|---|
| 5,691,619 A | * | 11/1997 | Vingsbo | .................. G05B 9/02 307/10.7 |
| 7,589,431 B2 | * | 9/2009 | Hentsch | ................. E05B 77/04 307/10.1 |
| 2002/0050841 A1 | * | 5/2002 | Murr | .................... H02J 13/0003 327/20 |

(Continued)

FOREIGN PATENT DOCUMENTS

| | | |
|---|---|---|
| DE | 42 13 131 A1 | 10/1993 |
| DE | 44 36 617 C1 | 5/1996 |

(Continued)

OTHER PUBLICATIONS

JP2006-2434 (Takeda/Shiroki Corp).*

*Primary Examiner* — Rexford Barnie
*Assistant Examiner* — Rasem Mourad
(74) *Attorney, Agent, or Firm* — Renner, Otto, Boisselle & Sklar, LLP

(57) ABSTRACT

A motor vehicle door latch mechanism, comprising a circuit arrangement with at least one sensor (9, 10, 11, 12) and with at least one connected control unit (6, 7), wherein the sensor (9, 10, 11, 12) has two or more switch states, and wherein two different control units (6, 7) are connected to the sensor (9, 10, 11, 12).

8 Claims, 3 Drawing Sheets

(51) Int. Cl.
*E05B 81/66* (2014.01)
*E05B 47/00* (2006.01)

(56) References Cited

U.S. PATENT DOCUMENTS

| | | | | |
|---|---|---|---|---|
| 2003/0111863 A1* | 6/2003 | Weyerstall | ............ | E05B 79/20 |
| | | | | 296/146.1 |
| 2006/0055178 A1* | 3/2006 | Graute | ................... | E05B 85/26 |
| | | | | 292/216 |
| 2011/0187519 A1* | 8/2011 | Nass | ....................... | E05B 85/26 |
| | | | | 340/438 |

FOREIGN PATENT DOCUMENTS

| | | | | |
|---|---|---|---|---|
| DE | 103 55 705 A1 | 7/2004 | | |
| DE | 10 2004 036 655 A1 | 2/2006 | | |
| DE | 10 2006 048 026 A1 | 5/2007 | | |
| DE | 102006048026 A1 * | 5/2007 | ............. | E05B 81/20 |
| DE | 20 2007 005 076 U1 | 9/2007 | | |
| DE | 202008010423 U1 * | 12/2009 | ............. | E05B 85/26 |
| DE | 20 2008 010 423 U1 | 1/2010 | | |
| FR | 2 477 762 A1 | 9/1981 | | |
| JP | 2006-2434 A | 1/2006 | | |
| WO | 2010/015236 A1 | 2/2010 | | |

* cited by examiner

MOTOR VEHICLE DOOR LATCH MECHANISM

CROSS REFERENCE TO RELATED APPLICATIONS

This application claims priority under 35 U.S.C. 119 and 35 U.S.C. 365 based upon German Patent Application No. 20 2010 004 424.3, filed on Mar. 31, 2010. The entire disclosure of the aforesaid application is incorporated herein by reference.

FIELD OF THE INVENTION

The invention relates to a motor vehicle door latch mechanism having a circuit arrangement with at least one sensor and with at least one connected control unit, wherein the sensor has two or more switch states.

BACKGROUND OF THE INVENTION

A motor vehicle door latch mechanism of the embodiment described above and disclosed in DE 20 2008 010 423 U1 is designed in such a way that the two switch states of the sensor belong to different current paths of a cable network. Essentially, two current paths are provided between which the sensor switches. In this way, the position of a rotary latch can, for instance, be determined with the aid of an On/Off switch, functioning as a sensor. Such an arrangement has generally proven to be successful.

Furthermore DE 42 13 131 A1 discloses a redundant switch arrangement containing two redundant parallel electric lines. Each line contains one switch consisting at least of one contact pair in each of the two lines. A monitoring unit including a fault detection device is arranged downstream of the double switch. The monitoring unit checks the electrical switch states of the contact pairs. In this way a switch arrangement with active redundancy is equipped with diagnostics capability. Diagnostics capability means that, for instance, intermediate states of one or two switches can be reliably determined.

Practical applications increasingly require for a signal of a sensor to be transferred from the connected control unit to another control unit. This requires an adaptation of the two control units during data exchange, which can often only be achieved with complex technical controls. The invention aims to remedy this situation.

SUMMARY OF THE INVENTION

The invention is based on the technical problem of further developing said motor vehicle door latch mechanism in such a way that sensor signals can be easily transmitted from the one connected control unit to another control unit.

In order to solve this technical problem, a generic motor vehicle door latch mechanism of the invention is characterized in that two different control units are connected to the sensor.

Contrary to known state of the art embodiments and DE 20 2008 010 423 U1, the sensor used in the invention ensures that his sensor signals reach two different control units (or more) simultaneously. There is thus expressly no data transfer of the sensor signal from one control unit to another control unit. Instead, both control units simultaneously receive the sensor signal to be evaluated.

A matching sensor signal is consequently instantly available at the two control units in question. The invention also offers the option of the same sensor supplying different sensor units with sensor signals. This is often required where the sensor and a control unit are designed as a single module, whose task is to communicate with different control units, depending on the type of vehicle. This is easily achieved by embodiments of the invention as the sensor signal provided by the sensor is and can be directly and simultaneously provided to the mostly varying control unit of the motor vehicle. These are the main advantages of the invention.

In an advantageous embodiment, one control unit is a central control unit, whilst the other control unit is preferably a secondary partial control unit. Generally, the central control unit is a vehicle electronics unit, whilst the partial control unit is an subassembly electronics unit. In most cases, the subassembly electronics unit is combined with the sensor and possibly other elements to form a single modular unit. This modular unit is installed in the motor vehicle.

Embodiments can be adapted to different motor vehicle types by operating at this point with different central control units. As the sensor signal from the sensor is provided simultaneously to the partial control unit as subassembly electronics unit and also to the respective central control unit, embodiments can be easily and directly adapted to different types of motor vehicles. The subassembly electronics unit can, for instance, be a power closing electronics unit. Also, an electronic window lifter unit or a side airbag electronics unit would be feasible.

The respective subassembly electronics unit functioning as partial control unit and other elements or subassemblies as well as one or several sensors usually form a modular unit, which is in most cases installed as a complete module in the associated motor vehicle. In case of a power closing electronics unit, the further elements usually include a motorized closing means and a corresponding motor vehicle door latch mechanism or an associated motor vehicle door latch.

The motor vehicle door latch, the motorized closing means and the power closing electronics unit as well as the sensor now form, for instance, a modular unit or an integrated module, installed as a whole unit in a motor vehicle door and, in particular, a motor vehicle side door. For the invention it suffices to combine the respective power closing electronics unit with the central control unit or the vehicle electronics unit. A respective connecting cable serves to provide only the sensor signals of the sensor integrated in the modular unit in the example to the power closing electronics unit as well as the vehicle electronics unit. Consequently, widely differing vehicle electronics units can be used, allowing a particular easy and functional adaptation to the respective desired vehicle type.

In an advantageous embodiment the sensor has diagnostic functions. In this case the sensor generally contains one switch as well as one or several current paths of a cable network. The described diagnostics function can be implemented as usually different currents flow through the individual current paths (whilst the supply voltage is the same). Indeed, current flows via a current path even when the switch is open. Consequently, the function of the voltage supply and also the basic function of the switch can be checked. When the switch is closed, the current of the supply voltage flows through another current path of the sensor. This is connected to another current, offering a simple method for differentiating between the opened and closed state of the switch.

For this purpose, a control unit is advantageously connected to two parallel central current paths. One of these two central current paths contains the switch. When the switch is open, current flows through the other central current path not containing a switch. If the switch is, however, closed, current provided by the supply voltage flows through the central current path with the switch closed.

Generally, at least three current paths are provided. In this context, the partial control unit is in most cases connected to the switch via another, third additional current path. There are thus two central current paths coupled to the central control unit, whilst the other third current path is connected to the partial control unit. The switch is also looped into the third additional current path.

An electronic separator element is provided to achieve a separation at this point or to separate the two current paths belonging to the one control unit from the current path belonging to the other control unit. This separator element is advantageously a rectifier diode.

In order to be able to provide the different currents in the respective at least three current paths of the cable network, all current paths of the cable network are equipped with electrical resistors. At a mainly constant supply voltage, these electrical resistors correspond with the individually varying current in the individual current paths. The resistors in the current paths are in most cases designed to continuously increase from one current path to the next.

In most cases, the resistor in the additional current path is the lowest rated, whilst the central current path without the looped-in switch, contains the highest-rated resistor. The rating of the resistor of the central current path with the looped-in switch lies between these two extremes. In this way, the electric current is at its lowest when the switch is open, as the current only flows over the central current path without the looped-in switch with the highest-rated resistor. If, on the other hand, the switch is closed, the current provided by the supply voltage flows, on one hand, via the central current path with looped-in switch and medium resistance and, on the other hand, via the additional current path with the lowest-rated looped-in resistor. As a result, the two currents can be easily distinguished from each other and any damage in the respective current paths can be easily diagnosed.

In this context the connection is arranged in such a way that, in relation to the current flow, the partial control unit is connected behind the separator element or the rectifier diode and also behind the resistor on the current path with the looped-in switch. At the same time, the connection point is located before the said switch, so that the switch position can be reliably checked with the aid of the partial control unit and also by the central control unit via the current path with the looped-in switch.

There is no reason to fear mutual interference at this point, as the separator element separates the connection point of the partial control unit from the central control. As a result, the two control units, i.e. the central control unit and the partial control unit control unit, can be supplied independently with the desired sensor signals or signals of the switch. The switch in question is generally an on/off switch and, in particular, a micro switch, although this is, of course, not mandatory.

Also the supply voltage can be clocked so that also clocked currents can be evaluated as regards the position of the switch (on/off) and/or the function of the individual current paths. This is naturally not mandatory, as in any case, the individual current paths can be easily distinguished from each other by the fact that the currents flowing through the current path clearly differ from each other due to the different looped-in resistors.

The sensor, i.e. the switch including the respective cable network, can as a whole be designed as a part of an electronic component carrier. This means that the switch with the resistors and the cable network can be defined as part of such a component carrier. An electronic component carrier is generally a printed circuit unit on which electrical or electronic parts or components can be or are accommodated. Parts and components can be arranged on one or also on both sides. Examples of such parts or components are connectors, micro switches, sensors, motors, etc.

The sensor on or at such an electronic component carrier can, in any case, be defined as a separate electronic component carrier or as a part of such an electronic component carrier. For a detailed design of such an electronic component carrier explicit reference is made to DE 20 2007 005 076 U1 of the applicant.

The electronic component carrier and thus the sensor may either be part of the central control unit or of the partial control unit. Both are generally possible. The invention also includes a mixed design, in which the sensor is wholly or partially integrated in the partial control unit and/or the central control unit. In order to provide a simple design and easy installation, the sensor is generally designed as part of the central control unit.

As a result, the invention provides a motor vehicle door latch mechanism equipped with a specially designed sensor. Indeed the sensor usually serves to check the position of a rotary latch of the motor vehicle door latch mechanism or generally of its locking mechanism. From the position of the rotary latch or of the locking mechanism, or from the information "Fully closed position or intermediate closed position reached yes/no?" information can, on one hand, be derived about the central control unit and, on the other hand, about the partial control unit or power closing electronics unit in the example.

The information "Fully closed position reached: yes" may correspond with the power closing electronics unit directly slowing down or stopping the closing means connected thereto. At the same time and independently thereof, the central control unit is informed about the reached fully closed position with the respective sensor signal. The central control unit can then issue a signal for assuming a double lock position for the motor vehicle door latch mechanism.

The respective sensor signal from the two actuated control units is in any case processed independently. At the same time, the described circuit ensures that the sensor on the whole is provided with a diagnostic function or that no undefined switch states are observed. For both the "closed" state of the switch as well as the "open" position of the switch correspond with a current flow, flanked by clearly differing currents. These different currents can be easily distinguished so that, on one hand, the functioning of the switch and, on the other hand, its functional position can be derived therefrom. These are the main advantages of the invention.

BRIEF DESCRIPTION OF THE DRAWINGS

Below, the invention is explained in detail with reference to exemplary drawings showing only one embodiment, as follows.

DETAILED DESCRIPTION OF THE INVENTION

Figure 1:
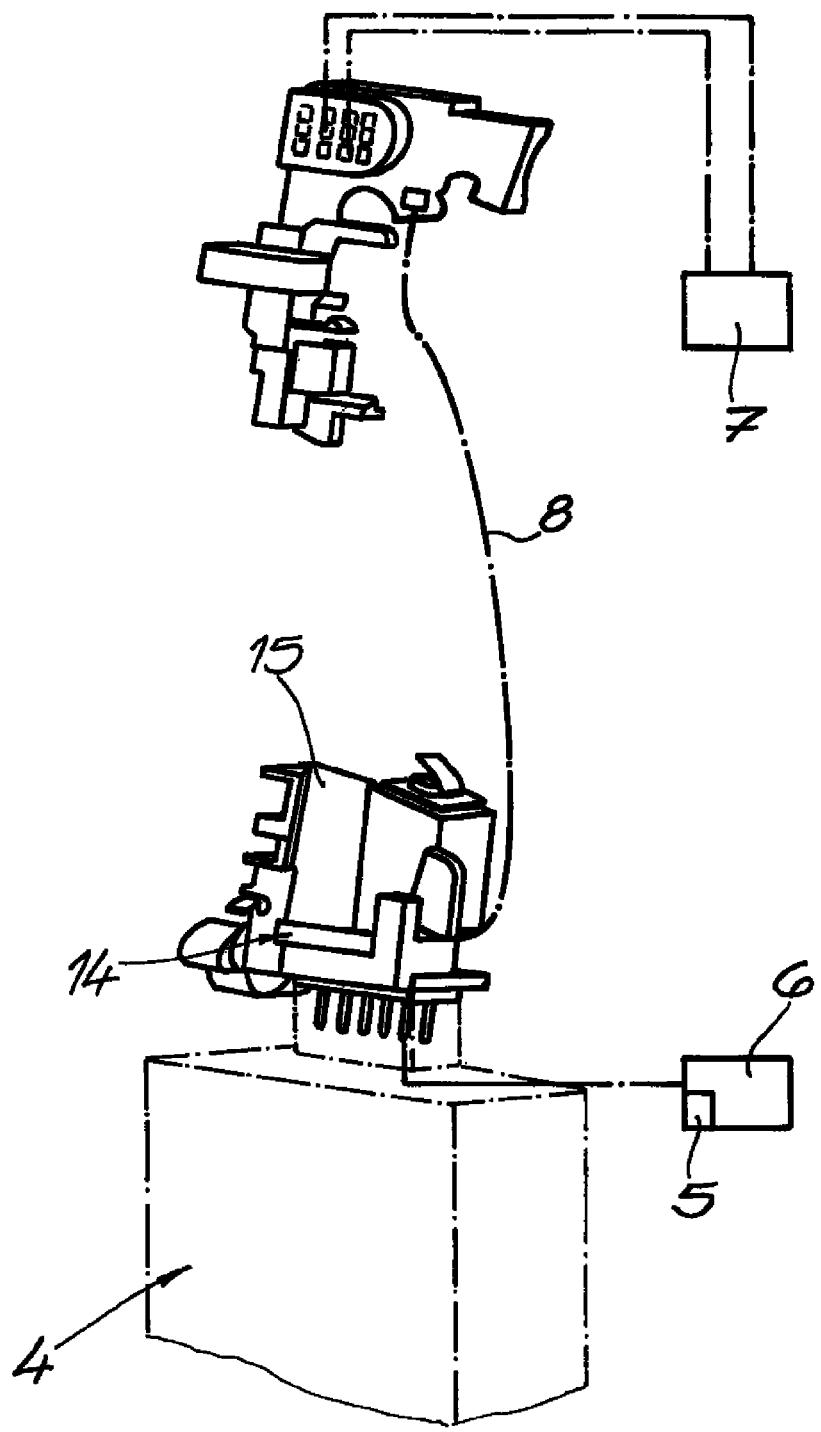
FIG. 1 provides a complete overview taking into consideration the motor vehicle door latch mechanism of the invention including respective control unit.

The figures show a motor vehicle door latch mechanism equipped with a locking mechanism 1, 2. The locking mechanism 1, 2 comprises a rotary latch 1 and a respective pawl 2.

A locking bolt 3 interacts with the locking mechanism 1, 2. The arrangement has the usual functionality, i.e. the locking mechanism 1, 2 is assigned to a door latch 4, which is normally situated inside a motor vehicle door. The door latch 4 interacts with the locking bolt 3, which is connected to a vehicle body (see enlarged view in FIG. 3). In the embodiment, the door latch 4 contains an indicated closing means 5 and a power closing electronics unit 6 assigned to the closing means 5.

Apart from this power closing electronics unit 6 or subassembly electronics unit or partial control unit 6, a central control unit 7 is also provided, designed in this case as a vehicle electronics unit 7. Like the closing means 5 and the door latch 4, the partial control unit or power closing electronics unit 6 is arranged inside a motor vehicle door (not shown), e.g. a motor vehicle side door. The central control unit or vehicle electronics unit 7 is, on the other hand, arranged inside a motor vehicle body (also not shown). The door latch 4 or the partial control unit 6 is connected to the central control unit 7 via a connecting cable 8, as apparent when comparing FIGS. 1 and 3. The connecting cable 8 primarily ensures that sensor signals of a sensor 9, 10, 11, 12 can be transmitted to the central control unit 7. The respective sensor signals are also simultaneously transmitted to the partial control unit 6 by the sensor 9, 10, 11, 12. This is particularly apparent from the diagrammatic view provided in FIG. 3.

Figure 3:
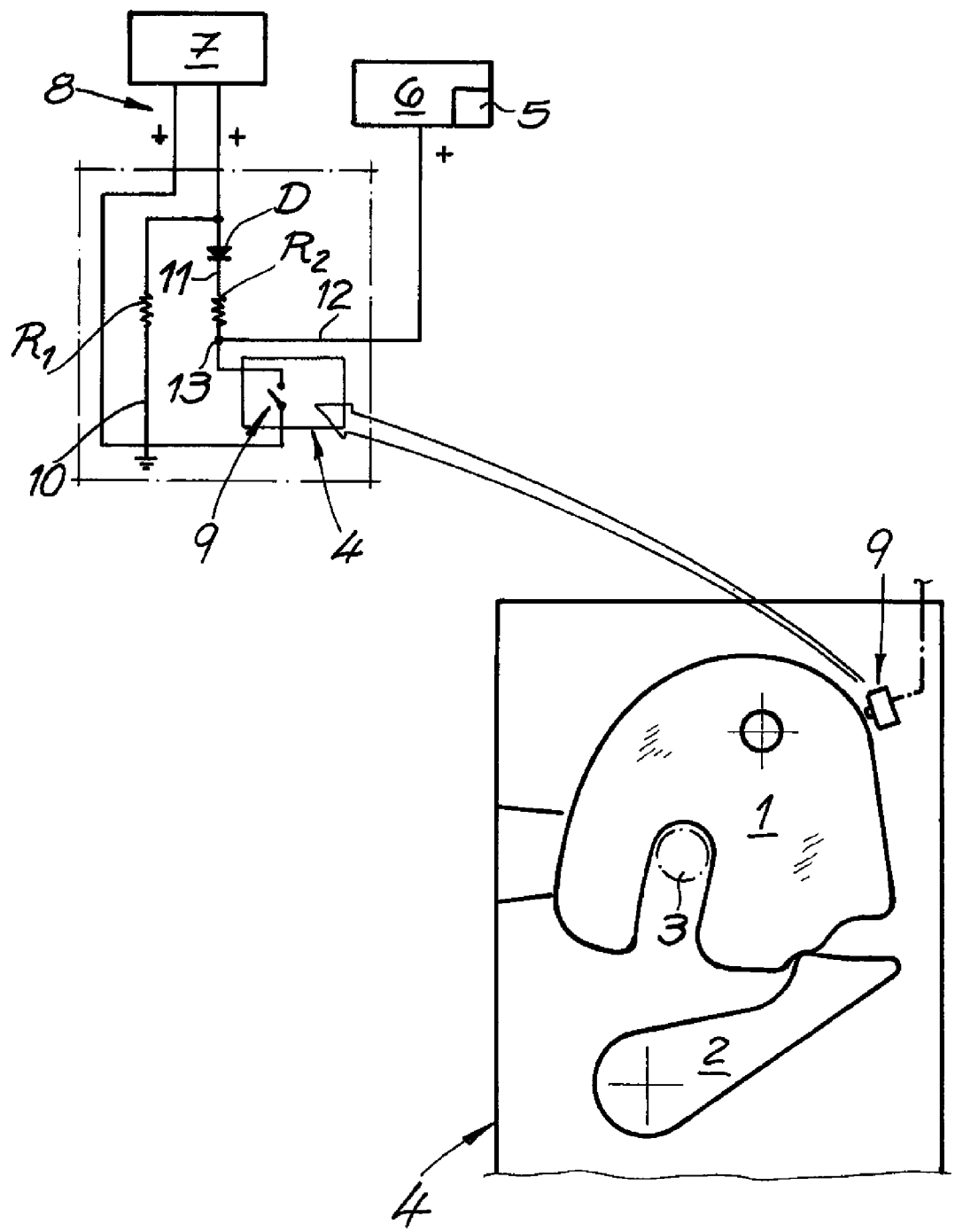
FIG. 3 represents a diagrammatic view of the motor vehicle door latch mechanism including the control units.

The illustration shows that, according to the invention, two different control units 6, 7 are consequently connected to the sensor 9, 10, 11, 12. These different control units 6, 7 are, on one hand, the partial control unit 6 and, on the other hand, the central control unit 7. The partial control unit 6 is designed as a power closing electronics unit 6 and acts upon the closing means 5. The partial control unit 6 is located inside the motor vehicle door or motor vehicle side door. The central control unit 7 inside the motor vehicle body serves, on the other hand, to monitor or control all or nearly all motor vehicle functions. FIG. 3 shows that the sensor 9, 10, 11, 12 has two or more switch states. These switch states are provided by a switch 9 as part of the sensor 9, 10, 11, 12. Switch 9 is actually able to depict the positions "on" and "off". Switch 9 is assigned to the rotary latch 1 and monitors that the latch assumes a certain functional position (intermediate closed position and/or fully closed position).

In the example, the sensor 9, 10, 11, 12 also has three current paths 10, 11, 12. The three current paths 10, 11, 12 form a cable network 10, 11, 12. The three current paths 10, 11, 12 differ from each other by the two current paths 10, 11 arranged parallel to each other being designed as central current paths 10, 11. The third current path 12 is, on the other hand, an additional current path 12. The two parallel central current paths 10, 11 are connected to a control unit 7 and in the embodiment, to the central control unit 7. The other third additional current path 12 is, on the other hand, connected to the control unit 6 and, according to the embodiment, the partial control unit 6.

The diagrammatic view in FIG. 3 shows that all current paths 10, 11, 12 of the cable network 10, 11, 12 contain different electrical resistors $R_1$, $R_2$. Because of these different resistors $R_1$, $R_2$, different electrical currents flow through the individual current paths 10, 11, 12, whilst the supply voltage is mainly constant and the same. This supply voltage (plus pole in FIG. 3) is indeed applied to the two central current paths 10, 11 and the additional current path 12. In this context only resistor $R_1$ is looped in the central current path 10 and is a higher-rated resistor than the resistors looped in the two other current paths 11, 12. The central current path 11 contains, on the other hand, a low-rated resistor $R_2$ and also the looped in switch 9. Also, a separator element D is looped into central current path 11, which in case of the embodiment, is a rectifier diode D.

At a connecting point 13, the additional current path 12 is connected to the central current path 11 with the looped-in switch 9. The connecting point 13 is, in relation to the direction of the current flow, arranged before the switch 9 and behind the resistor $R_2$. In relation to the direction of the current flow, the connecting point 13 is also positioned behind the rectifier diode D.

The additional current path 12 does not contain a looped-in resistor arranged directly in the door latch 4. In this way the insurance ensures that all current paths 10, 11, 12 of the cable network 10, 11, 12 contain different electrical resistors $R_1$, $R_2$. These resistors $R_1$, $R_2$ each produce different currents in the individual current path 10, 11, 12. The system is designed in such a way that the resistor in the respective current path 10, 11, 12 constantly increases in size, starting from the additional current path 12, containing the lowest-rated resistor. The highest-rated resistor $R_1$ is located in the central current path 10 without the looped-in switch 9. The central current path 11 with the looped-in switch 9 contains a medium-rated resistor $R_2$. According to the embodiment, the resistor $R_1$ is a 3.9 k$\Omega$ resistor, whilst resistor $R_2$ is only a 510 $\Omega$ resistor. This is naturally only an example.

Figure 2:
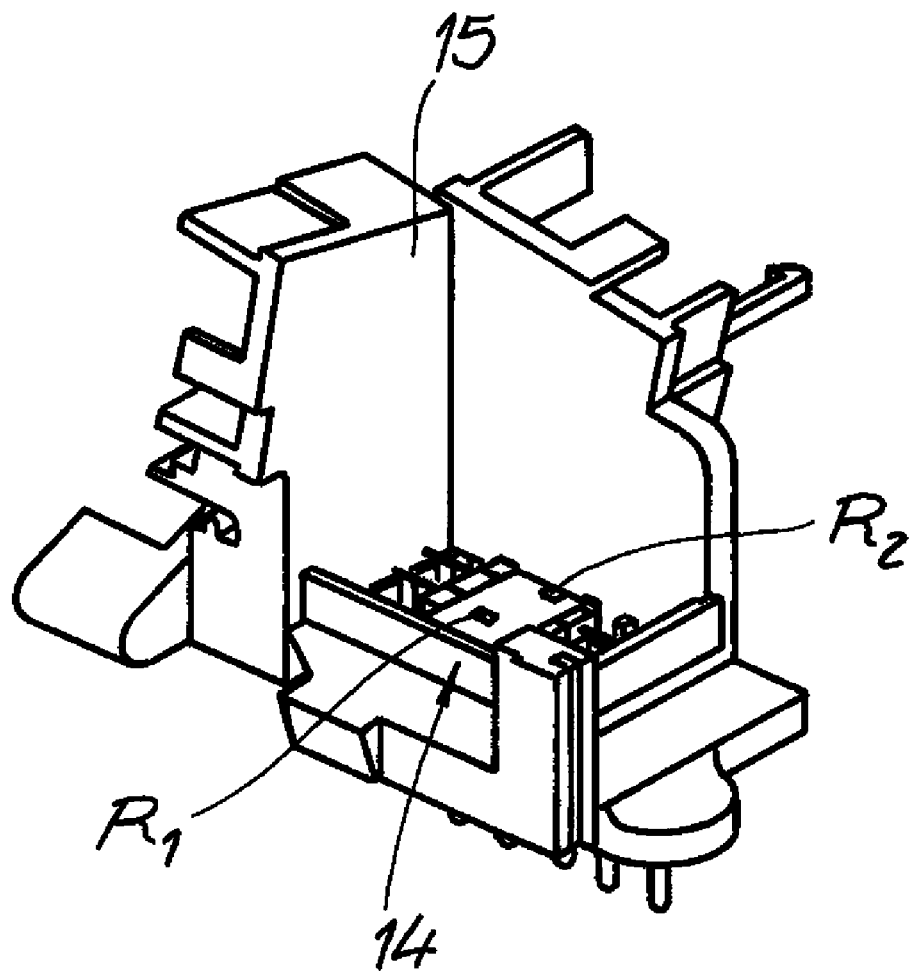
FIG. 2 shows a detail of FIG. 1.

FIG. 2 shows that sensor 9, 10, 11, 12 is designed as a part of electronic component carrier 14. This electronic component carrier 14 is, in turn, part of a connector housing 15, shown mainly in FIG. 2. The connector housing 15 is in turn connected to the door latch 4. The partial control unit or power closing electronics unit 6 communicates with door latch 4. Also said closing means 5, which in turn is acted upon by the power closing electronics unit 6, also communicates with the door latch 4.

The system functions as follows.

Switch 9 or micro switch 9 allocated to rotary latch 1 can be closed in the "intermediate closed" position of the rotary latch 1 in relation to pawl 2. As long as the respective switch 9 is in its "open" position, a current flows from the central control unit 7 via its output (plus pole) through the central current path 10 and via resistor $R_1$ to ground or to the respectively marked input of the central control unit 7. For this a certain current is required which is set by resistor $R_1$, taking into account the supply voltage. This current is detected with the aid of the central control unit 7 and documented, so that the supply voltage is applied and the cable network 10, 11, 12 is generally functional.

As soon as the switch 9 assumes the "closed" position, which in case of the example corresponds with reaching the intermediate closed position of the rotary latch 1, a sensor current from the central control unit 7 flows no longer via the central current path 10 but via the parallel central current path 11. This is due to the lower-rated resistor $R_2$ on the central current path 11. At the same time, a sensor current flows from the partial control unit 6 also via the now closed switch 9, namely through connecting point 13. The rectifier diode D prevents that the two currents interfere with each other through the central current path 11 and the additional current path 12.

The sensor signal causes the partial control unit 6 to act upon the closing means 5, moving the rotary latch 1 from the detected intermediate closed position into the fully closed position. An example of such a closing means is disclosed in DE 10 2004 036 655 A1. At the end of this closing process, the rotary latch 1 is in the fully closed position and the closing means 5 is switched off.

It is to be understood that the above-described embodiment is illustrative of only one of the many possible specific embodiments which can represent applications of the principles of the invention. Numerous and varied other arrangements can be readily devised by those skilled in the art without departing from the spirit and scope of the invention.

What is claimed is:

1. A motor vehicle door latch mechanism, comprising: a circuit arrangement with at least one sensor (9, 10, 11, 12) and with two different, connected control units (6, 7), wherein the sensor (9, 10, 11, 12) has two or more switch states, and wherein the two different control units (6, 7) are connected to the sensor (9, 10, 11, 12), wherein the sensor (9, 10, 11, 12) contains a switch (9), and one control unit (7) is connected to two parallel, central current paths (10, 11) of a cable network (10, 11, 12), with one current path (11) containing the switch (9), and an other control unit (6) is connected to the switch (9) via a third, additional current path (12) of the cable network (10, 11, 12), wherein all current paths (10, 11, 12) of the cable network (10, 11, 12) contain different electrical resistors (R1, R2), corresponding to the respective varying current in the individual current path (10, 11, 12), with the supply voltage being mainly constant, and wherein the two, central current paths (10, 11) belonging to the control unit (7) and the third, additional current path (12) belonging to the other control unit (6) are separated from each other by an electronic separator element (D).

2. The motor vehicle door latch mechanism according to claim 1, wherein the one control unit (7) is a central control unit (7) and the other control unit (6) is a secondary partial control unit (6).

3. The motor vehicle door latch mechanism according to claim 2, wherein the central control unit (7) is designed as a vehicle electronics unit (7) and the partial control unit (6) as a subassembly electronics unit (6), consisting of a power closing electronics unit (6).

4. The motor vehicle door latch mechanism according to claim 1, wherein the sensor (9, 10, 11, 12) has a diagnostic function.

5. The motor vehicle door latch mechanism according to claim 1, wherein the resistors (R1, R2) in the current paths (10, 11, 12) are designed to constantly increase from one current path to the next, starting with the additional current path (12) and ending with the central current path (10) without a looped-in switch (9).

6. The motor vehicle door latch mechanism according to claim 1, wherein the separator element (D) is a rectifier diode (D).

7. The motor vehicle door latch mechanism according to claim 1, wherein the sensor (9, 10, 11, 12) is designed as part of an electronic component carrier (14).

8. The motor vehicle door latch mechanism according to claim 2, wherein the sensor (9, 10, 11, 12) is wholly or partly integrated in the partial control unit (6) and/or the central control unit (7).

* * * * *